(12) United States Patent
Colton

(10) Patent No.: US 8,730,160 B2
(45) Date of Patent: May 20, 2014

(54) RETENTION MECHANISM FOR A NAVIGATION TOOL

(75) Inventor: Fabien Colton, Kars (CA)

(73) Assignee: Blackberry Limited, Waterloo (CA)

( * ) Notice: Subject to any disclaimer, the term of this patent is extended or adjusted under 35 U.S.C. 154(b) by 503 days.

(21) Appl. No.: 13/022,089

(22) Filed: Feb. 7, 2011

(65) Prior Publication Data

US 2012/0200496 A1 Aug. 9, 2012

(51) Int. Cl.
*G06F 3/033* (2013.01)
(52) U.S. Cl.
USPC .......................................... 345/157; 345/175
(58) Field of Classification Search
USPC .................................................. 345/156–184
See application file for complete search history.

(56) References Cited

U.S. PATENT DOCUMENTS

| | | | |
|---|---|---|---|
| 5,711,680 A | 1/1998 | Tsuneaki | |
| 5,967,837 A | 10/1999 | Wolfe | |
| 6,218,659 B1 * | 4/2001 | Bidiville et al. | 250/221 |
| 6,369,798 B1 * | 4/2002 | Yatsu et al. | 345/167 |
| 6,442,818 B1 | 9/2002 | Kay | |
| 6,768,070 B2 | 7/2004 | Lewison | |
| 6,814,530 B2 | 11/2004 | Franco | |
| 7,106,303 B2 * | 9/2006 | Bricaud et al. | 345/167 |
| 7,158,119 B2 * | 1/2007 | Yokoji et al. | 345/167 |
| 7,860,237 B2 * | 12/2010 | Takashima et al. | 379/433.06 |
| 7,880,723 B2 * | 2/2011 | Lu | 345/166 |
| 7,970,431 B2 * | 6/2011 | Chen et al. | 455/550.1 |
| 7,991,149 B2 * | 8/2011 | Takashima et al. | 379/433.06 |
| 8,073,138 B2 * | 12/2011 | Takashima et al. | 379/433.06 |
| 2004/0095324 A1 * | 5/2004 | Bricaud et al. | 345/167 |
| 2005/0162390 A1 * | 7/2005 | Selby et al. | 345/163 |
| 2008/0142690 A1 * | 6/2008 | Liu et al. | 250/221 |
| 2010/0053086 A1 * | 3/2010 | Huang et al. | 345/167 |
| 2010/0309134 A1 * | 12/2010 | Betts-Lacroix et al. | 345/169 |
| 2011/0134041 A1 * | 6/2011 | Yamamoto et al. | 345/167 |
| 2011/0134042 A1 * | 6/2011 | Rayner | 345/167 |
| 2011/0205179 A1 * | 8/2011 | Braun | 345/174 |
| 2012/0106092 A1 * | 5/2012 | Chen | 361/728 |

OTHER PUBLICATIONS

Haier H-U8W—Chinese WM Communicator middle class; Maradona; Dec. 25, 2009; Downloaded May 25, 2012 ; http://phonestechnology.blogspot.com/2009/12/haier-h-u8w-chinese-wm-communicator.html.

* cited by examiner

*Primary Examiner* — Dmitriy Bolotin
(74) *Attorney, Agent, or Firm* — Novak Druce Connolly Bove + Quigg LLP

(57) ABSTRACT

A retention mechanism for a navigation tool of a mobile device includes a base member and a retainer member. The base member is adapted for insertion into a cutout of a support structure of the mobile device. The retainer member is configured for mating engagement with the base member. A navigation tool is retained between the base member and the retainer member, and a portion of the navigation tool extends through an aperture of the retainer member. A support structure of the mobile device can form a cutout corresponding to the base member to receive the retention mechanism. The base member can protrude through cutout so a bottom of the base member extends a distance beyond a bottom surface of the support structure, thereby allowing for the implementation of navigation tool on a mobile device without significantly altering the profile of the mobile device.

23 Claims, 11 Drawing Sheets

RETENTION MECHANISM FOR A NAVIGATION TOOL

FIELD

The present disclosure generally relates to mobile devices, and more specifically relates to navigation tools for mobile devices.

BACKGROUND

With the advent of more robust electronic systems, advancements of mobile devices are becoming more prevalent. Mobile devices can provide a variety of functions including, for example, telephonic, audio/video, and gaming functions. Mobile devices can include mobile stations such as cellular telephones, smart telephones, portable gaming systems, portable audio and video players, electronic writing or typing tablets, mobile messaging devices, personal digital assistants, and handheld computers.

Whereas in the past, such mobile devices typically accommodated voice transmission (cell phones) or text transmission (pagers and PDAs), today's consumer often demands a combination device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs), which may have originally been designed to accommodate making and receiving telephone calls and sending messages over a related Short Messaging Service (SMS). As the available functions of electronic devices continue to increase, the functionality of the UIs also needs to improve. Electronic devices often have limited space for input devices and display screens. As a result, the size of the keyboard, the function buttons, the display and other components of the electronic device can be compromised to fit the switch panel on the electronic device. As might be expected, suppliers of such mobile electronic devices and the related service providers are seeking to meet these customer requirements. The requirements of these more advanced functionalities have in many circumstances rendered the traditional user interfaces unsatisfactory. This situation has caused designers to improve the UIs, through which users input information and control the devices associated with the UIs.

BRIEF DESCRIPTION OF THE DRAWINGS

Exemplary methods and arrangements conducted and configured according to the advantageous solutions presented herein are depicted in the accompanying drawings wherein.

DETAILED DESCRIPTION

Figure 1:
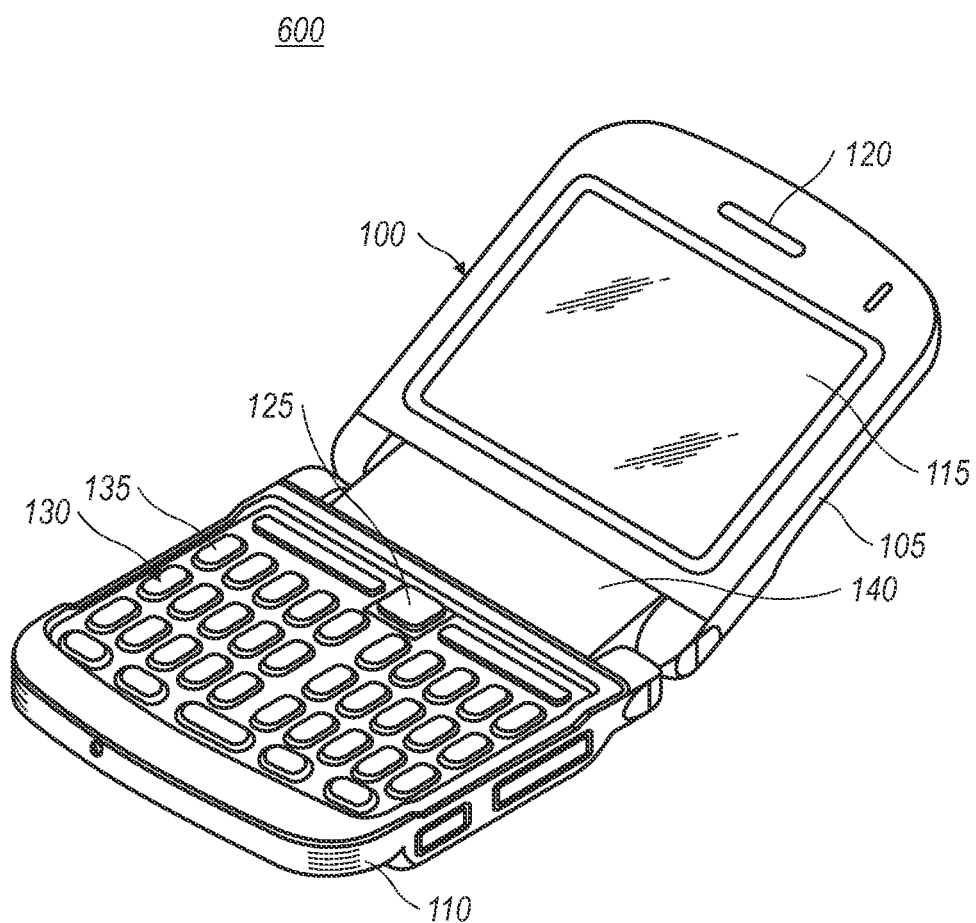
FIG. 1 illustrates an exemplary mobile device in an open configuration having a navigation tool retained in a retention mechanism in accordance with an exemplary implementation of the present disclosure.

As will be appreciated for simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Navigation tools such as trackballs, trackpads, omnidirectional joy sticks, and other similar tools utilized to alter and select graphical information and items displayed on display screens of mobile devices can occupy a substantially significant portion of the mobile device housing. For example, in some devices, the navigation tool is utilized as a press-actuable key or button. As the navigation tool requires space to for the navigation tool to be pressed down, the mobile device must have a thicker housing to accommodate the clearance space needed for the navigation tool to be pressed down. In other devices the navigation tool includes a trackball which includes a rotatable ball that is rotatable in the mobile devices housing. To accommodate the rotatable trackball mechanism, the mobile device requires additional space within the housing, thereby resulting in a large thickness profile for the mobile device. For example, as more space is required within the mobile device housing to provide clearance for the ball of the trackball to rotate, the mobile device can have a thickness greater than mobile devices which have navigation keys or navigation touchpads.

Additionally, some mobile devices, such as clamshell style or flip style mobile devices, have even less space in the mobile device housing. Clamshell style and flip style mobile devices typically include a display housing and a keyboard housing connected by a hinge such that the mobile device has an open configuration and a closed configuration. In the closed configuration, the display housing and the keyboard housing are pivoted about the hinges so that the display housing is substantially parallel to the keyboard housing. In other words, in the closed configuration, the display housing and the keyboard housing have been pivoted with respect to each other, such that the display housing and the keyboard housing are stacked on top of one another. Navigation tools are typically placed on an inside face of either the display housing or the keyboard housing. Additionally, the navigation tools will have a thickness thereby allowing the user of the mobile device to press-actuate the navigation tool into the display housing or keyboard housing if the navigation tool is press-actuable. In other devices, the navigation tool will have a thickness to accommodate a rotatable ball, an omnidirectional joystick, or other user-manipulable navigation tool. As the navigation tool adds to the thickness profile of the display housing or the keyboard housing, the navigation tool also adds to the overall thickness profile of the mobile device, thereby resulting in a thicker and bulkier device than a mobile device having a directional keypad, directional keys or a navigation touch pad. To address the above described shortcomings, the present disclosure provides a retention mechanism for a navigation tool.

Several definitions that apply throughout this disclosure will now be presented. The word "coupled" is defined as connected, whether directly or indirectly through intervening components, and is not necessarily limited to physical connections. The term "communicatively coupled" is defined as connected, whether directly or indirectly, through intervening components, is not necessarily limited to a physical connection, and allows for the transfer of data. The term "mobile device" is defined as any electronic device that is capable of at least accepting information entries and can include a power source. A "wireless communication" means communication that occurs without wires, using electromagnetic radiation, for example. The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies. The term "optical navigation tool" refers to a navigation tool that receives inputs via optical sensors. Examples of optical navigation tools can include but are not limited to optical trackballs, jogballs, optical trackpads, or any other optical navigation tool that receives inputs via optical sensors.

In accordance with the present disclosure, a retention mechanism for a navigation tool of a mobile device includes a base member and a retainer member. The base member is inserted into a cutout of a support structure of the mobile device. The base member can be made of a material that provides one or both of RF shielding and EMI shielding. The retainer member is configured to matingly engage with the base member, and the upper surface of the retainer member defines an aperture. A navigation tool can be retained between the base member and the retainer member. When the base member and the retainer member are matingly engaged, a portion of the navigation tool extends through the aperture of the retainer member, thereby allowing a user to engage or manipulate the navigation tool. The retention mechanism can be coupled to a support structure when the navigation tool and retention mechanism are assembled on a mobile device. In at least one implementation, the support structure defines a cutout corresponding to a shape of base member of the retention mechanism. Additionally, when the retention mechanism and the navigation tool are assembled on the mobile device, the support structure can be communicatively coupled to the navigation tool and a display screen to allow inputs received at the navigation tool to alter images or graphical user interfaces displayed on the display screen. corresponding to a shape of base member of the retention mechanism. Additionally, when the retention mechanism and the navigation tool are assembled on the mobile device, the support structure can be communicatively coupled to the navigation tool and a display screen to allow inputs received at the navigation tool to alter images or graphical user interfaces displayed on the display screen.

FIG. 1 illustrates an exemplary embodiment of a mobile device having a navigation tool retained in retention mechanism in accordance with the present disclosure. In FIG. 1, the mobile device 100 is a clamshell-type mobile device having a display housing 105 and a keyboard housing 110. The display housing contains a display screen 115 on which graphical items such as pictures, applications, and graphical user interfaces, can be displayed and altered. The display screen 115 can be a liquid crystal display (LCD) screen, a light emitting diode (LED) screen, on organic light emitting diode (OLED) screen, an active-matrix organic light emitting diode (AMOLED) screen, a nanocrystal display, a nanotube display, a touch-sensitive display screen, or any display screen on which graphical or visual elements can be displayed. Above the display screen 115 is a speaker 120. The speaker 120 can be adapted to emit sound from the mobile device 100. The display housing 105 can be coupled to the keyboard housing 110 by a hinge 140.

In the implementation illustrated in FIG. 1, the hinge 140 allows the keyboard housing 110 and the display housing 105 to rotate with respect to each other. The hinge 140 also provides the mobile device 100 with a first configuration 600 and a second configuration 700 (illustrated in FIG. 7). In FIG. 1, the first configuration 600 is an open configuration. In at least one implementation, in the first configuration 600, the display housing 105 and the keyboard housing 110 have been pivoted with respect to each other to form a first angle greater. For example, the display housing 105 and the keyboard housing 110 can form an angle greater than ninety (90) degrees therebetween. The second configuration 700 can be a closed configuration. In at least one implementation, in the second configuration 700, the display housing 105 and the keyboard housing 110 have been pivoted with respect to each other such to form a second angle. For example, the display housing 105 and the keyboard housing 110 can form an angle less than forty-five (45) degrees therebetween. Further details as to the second configuration 700 of the mobile device 100 will be discussed in relation to FIG. 7.

Returning to the open configuration 600 illustrated in FIG. 1, the mobile device 100 further includes a keyboard housing 110. The keyboard housing contains the keyboard 130, and a navigation tool assembly 125. The navigation tool assembly 125 includes a navigation tool housed in a retention mechanism according to an exemplary implementation of the present disclosure. The navigation tool assembly 125 can include a navigation tool. For example, the navigation tool can be an optical omnidirectional pad, an optical jogball, an optical trackball, a mechanical trackball, an optical or mechanical omni-directional joystick, or any other similar navigation tool. Below the navigation tool assembly 125 is the keyboard 130 having a plurality of keys 135. The keyboard 130 can be a full keyboard, a reduced keyboard, or a numerical keypad. In the illustrated implementation, each key 135 of the keyboard 130 bears at least one of an alphabetic, numeric, symbolic, or functional indicia. The indicia signify the data to be input upon actuation of the key 135 bearing the indicia. In FIG. 1, the keyboard 130 is a full keyboard, comprising at least twenty-six keys, where twenty-six of the keys are each associated with an alphabetic indicia. The indicia on the keys 135 of the keyboard 130 can be arranged in a QWERTY keyboard layout, an AZERTY layout, a QWERTZ layout, a DVORAK layout, a pinyin Chinese keyboard layout, or any other keyboard layout that allows a user to input alphabetic, numeric, symbolic, and functional indicia. The keys 135 can be press-actuable keys, touch-sensitive keys, capacitive keys, or any other similar key that allows for the input of data to a processor of the mobile device upon user-engagement with the key 135. While the illustrated embodiment in FIG. 1 is a full keyboard, in another embodiment, the keyboard 130 can be a reduced keyboard, where each key 135 is associated with more than one alphabetic indicia.

Figure 2:
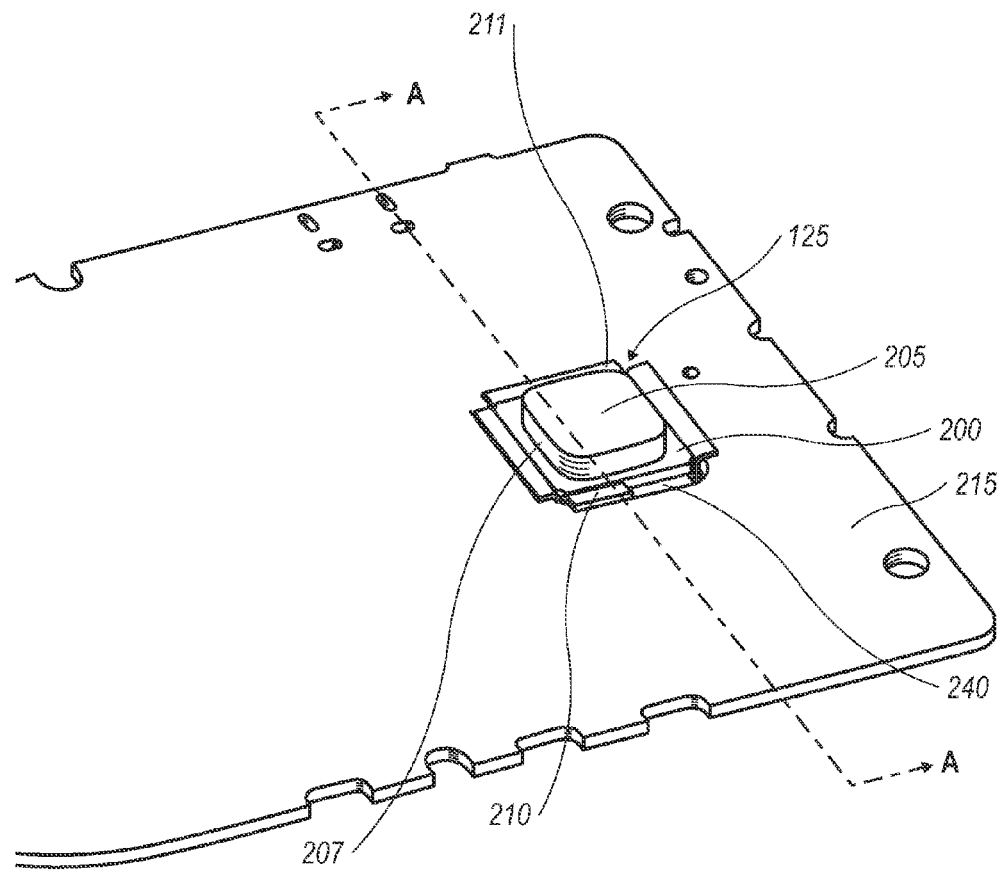
FIG. 2 is a perspective view of a support structure assembled with a navigation tool retained in a retention mechanism in accordance with an exemplary implementation of the present disclosure.

FIG. 2 illustrates an exemplary embodiment of a navigation tool assembly coupled to a support structure of a mobile device. A dashed line A-A extends across the navigation tool assembly and the support structure 215 defining the line on which a cross-section of the navigation tool assembly can be taken. The exemplary embodiment of the navigation tool assembly illustrated in FIG. 2 includes a navigation tool 205 retained by a retention mechanism having a base member 210 and a retainer member 200. The base member 210 and the retainer member 200 are configured for mating engagement thereby securing a navigation tool 205 therebetween. In FIG. 2, when the base member 210 and the retainer member 200 are matingly engaged, a slot 240 can be formed therebetween. The slot 240 can be an opening adapted to receive a flexible circuit or other connecting wires that can communicatively couple the navigation tool 205 with the support structure 215. In at least one implementation, a flexible circuit or connecting wires can extend through the slot 240 to allow for the connection of the navigation tool 205 with the support structure 215.

In FIG. 2, the illustrated navigation tool 205 is a trackpad. However, one of ordinary skill in the art will appreciate that the navigation tool 205 can also be an optical trackball, a jog ball, or any other navigation tool which can be retained between a retainer member 200 and a base member 210. The exemplary navigation tool 205 further includes a central portion 207 which a user can engage to manipulate the navigation tool 205. The central portion 207 of the navigation tool 205 protrudes through an opening (not shown) formed in the retainer member 200 of the retention mechanism.

As illustrated in FIG. 2, the base member 210 of the navigation tool assembly is supported on the support structure 215. Although not shown, the support structure 215 defines a cutout corresponding to a shape of the base member 210. The base member 210 can be inserted in the cutout of the support structure 215. The base member 210 can protrude through the cutout such that a bottom surface or a floor of the base member 210 protrudes beyond a bottom surface of the support structure 215. The base member 210 can further include a flange 211 extending from an upper edge of the base member 210. The flange 211 is shaped to rest against the upper surface of the support structure 215, thereby supporting the navigation tool assembly to the support structure 215. In the illustrated implementation, the base member 210 is soldered to the support structure 215 at the flanges 211. However, one of ordinary skill will appreciate that the base member 210 need not be soldered but can instead be adhered to the support structure 215, bolted to the support structure 215, or secured to the support structure 215 by any other securement method. Further details of the base member 210 will be discussed in relation to FIGS. 3 and 4.

Figure 3:
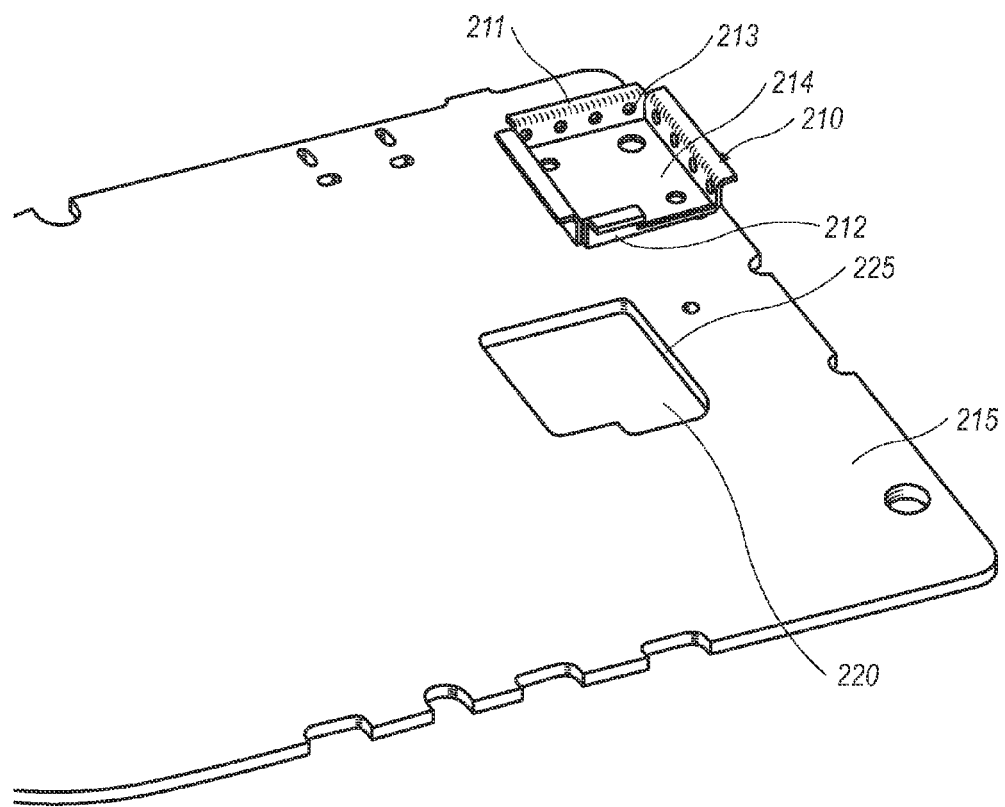
FIG. 3 is an exploded view of a support structure and a base member of a retention mechanism in accordance with an exemplary implementation of the present disclosure.

FIG. 3 is an exploded view of a base member 210 of an exemplary retention mechanism for a navigation tool and a support structure 215 for a mobile device. In FIG. 3, the support structure 215 is a printed circuit board (PCB). In other implementations, the support structure 215 can also be a flexible circuit board, any other circuit board, a plastic support, a metal support, or any other support structure to which a navigation tool 205 can be coupled. As illustrated in FIG. 3, the support structure 215 defines a cutout 220 corresponding to the base member 210 of the retention mechanism. More specifically, an edge 225 of the support structure 215 defines the cutout 220. In at least one implementation, the shape of the cutout 220 corresponds to the shape of the base member 210. However, one of ordinary skill in the art will appreciate that the cutout 220 can be any other shape, so long as the base member 210 can be inserted therethrough.

In FIG. 3, the base member 210 is an open box-like structure. For example, in the implementation of FIG. 3, the base member 210 is a five-sided box-like structure having a bottom or a floor 214 and a plurality of side walls 212 that extend from the bottom 214. Each side wall 212 has a top edge and a bottom edge where the bottom edge is connected to the bottom 214 of the base member 210. The implementation illustrated in FIG. 3 further includes the top edge of each side wall 212 forming a lip or a flange 211. The flange 211 is configured to support the navigation tool 205 on the support structure 215. For example, the flange 211 extends a predetermined distance away from the top edge of the of the side wall, thereby providing a surface of the base member 210 configured to rest against the upper surface of the support structure 215. As a result, the base member 210 is secured to and supported by the upper surface of the support structure 215. Also illustrated in FIG. 3, two adjacent side walls 212 define a void therebetween thereby providing a bottom portion of the slot 240 (illustrated in FIG. 2) that will be formed when the base member 210 and the retainer member 200 are matingly engaged. The slot 240 can be provided to receive the flexible circuit or connecting wires that can communicatively couple the navigation tool 205 to the support structure 215.

FIG. 3 also illustrates that each side wall 212 can include a plurality of openings 213. More specifically, in the example shown, each side wall 212 has four openings 213; however, one of ordinary skill in the art will appreciate that the side walls 212 can have fewer or more than four openings 213 or no openings. The plurality of openings 213 are configured to receive a tab, protrusion, or other securement from the retainer member 200, thereby providing the mating engagement between the retainer member 200 and the base member 210. As illustrated in FIG. 3, the plurality of side walls 212 and the bottom 214 define a cavity for receiving the navigation tool 205.

Although the illustrated embodiment of the base member 210 includes four side walls 212, one of ordinary skill in the art will appreciate that the base member 210 can have fewer or more side walls 212 than are illustrated in FIG. 3, so long as the base member 210 has at least one side wall 212 to support the bottom 214. Additionally, while FIG. 3 illustrates each side wall 212 having a flange 211 formed at the top edge of the side wall 212, one of ordinary skill will appreciate that fewer than all of the side walls 212 can have a flange 211. One of ordinary skill in the art will understand that at least one side wall 212 can have a flange 211 thereby providing at least one surface configured to support the navigation tool 205 on the support structure 215. In another exemplary implementation, the flange 211 can be a uniform flange 211 formed around the top edges of the side walls 212 rather than individual flanges 211 formed on each side wall 212, as illustrated in FIG. 3. Moreover, while the base member 210 illustrated in FIG. 3 is an open box-like structure, one of ordinary skill in the art will appreciate that the base member 210 can be any structure that can be inserted through a cutout of the support structure 215, secured to the support structure 215 and that can support a navigation tool 205 for a mobile device 100.

Figure 4:
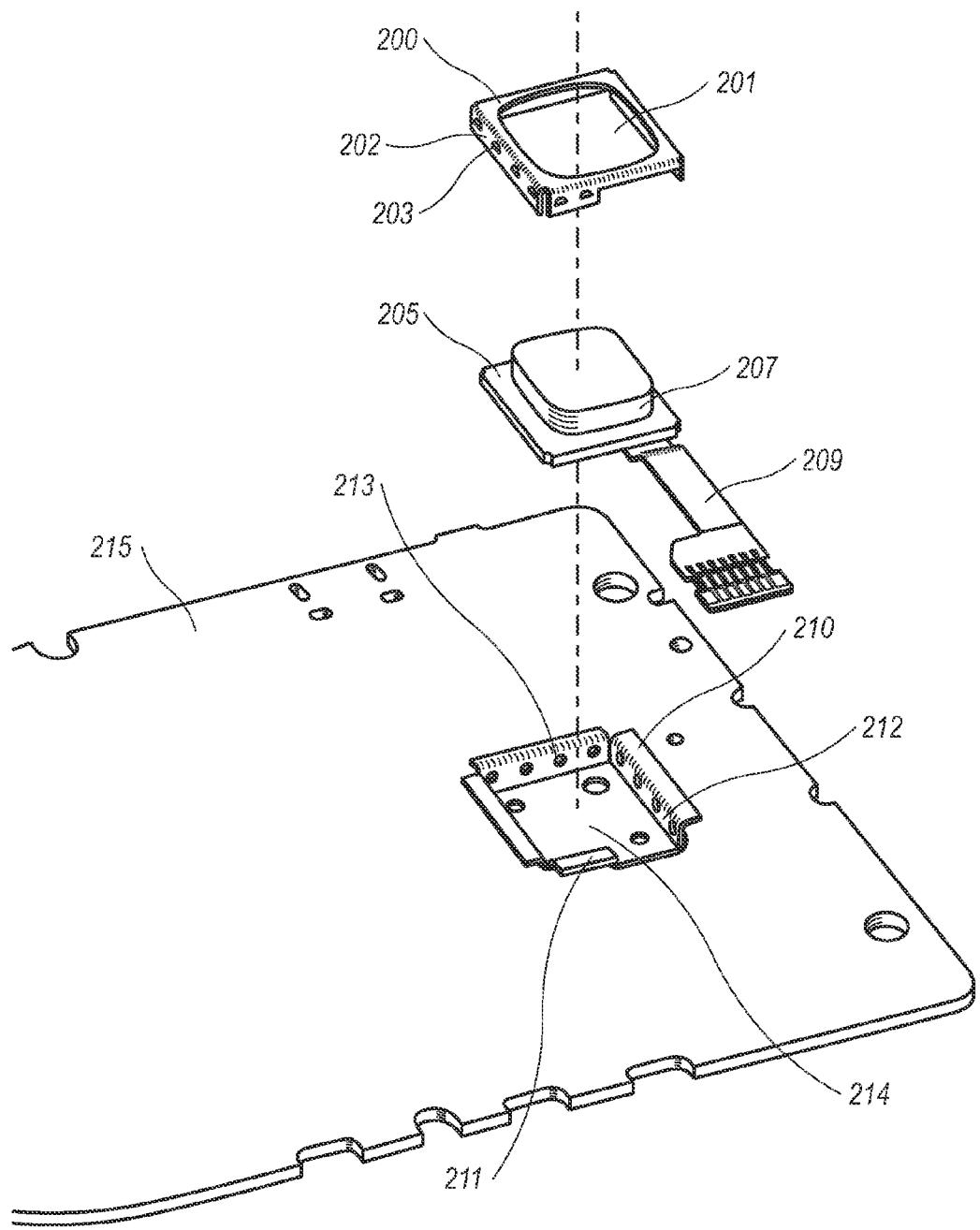
FIG. 4 is an exploded view of the navigation tool and the retention mechanism illustrated in FIG. 2 with the base member of the retention mechanism assembled to the support structure in accordance with an exemplary implementation of the present disclosure.

FIG. 4 is an exploded view of the exemplary navigation tool assembly assembled to a support structure 215 illustrated in FIG. 2 with the base member 210 of the retention mechanism coupled to the support structure 215. The base member 210 illustrated in FIG. 4 is substantially similar to the base member illustrated in FIG. 3. The navigation tool 205 is an optical trackpad which can be press-actuated. In FIG. 4, the navigation tool 205 includes a center portion 207 and a connector 209 extending away from the center portion 207 of the navigation tool 205. The center portion includes the top or exposed portion of the navigation tool 205 which can be engaged to manipulate the navigation tool 205. The connector 209 can communicatively couple the navigation tool 205 to the support structure 215, thereby allowing inputs received at the exposed portion 207 of the navigation tool 205 to perform functions on information and graphical items displayed on the display screen 115 of the mobile device 100. In the illustrated embodiment, the connector 209 can be a flexible circuit. In other implementations, the connector 209 can be a connector, or other circuit or connector, which can communicatively couple the navigation tool 205 to the support structure 215. Although, FIG. 4 illustrates a navigation tool 205 that is a trackpad, one of ordinary skill in the art will appreciate that the navigation tool 205 can also be an optical trackball, a jogball, or any other navigation tool which can be retained between the base member 210 and the retainer members 200.

FIG. 4 also illustrates a retainer member 200 defining an aperture 201 to receive the exposed portion 207 of the navigation tool 205. More specifically, an inner edge of the retainer member 200 defines an inner perimeter forming the aperture 201. The exemplary retainer member 200 illustrated in FIG. 4 is a five sided box-like structure having four walls 202 and a top surface. The top surface forms the opening 201 through which the navigation tool 205 protrudes. Also illustrated in FIG. 4, a void is formed between two adjacent walls 202. The void forms the upper portion of the slot 230. The void between the two adjacent walls 202 correspond to the void formed by the two adjacent side walls 212 of the base member 210 to form a passageway for the connector 209 to pass through. Thus, when the retainer member 200 and the base member 210 matingly engage, the void of the retainer member 200 and the void of the base member 210 form the slot 230 (shown in FIG. 2). The connector 209 of the navigation tool 205 can extend through the slot 230 to communicatively couple the navigation tool 205 to the support structure 215.

FIG. 4 illustrates the details of an example of a snap-in type mating engagement between the retainer member 200 and the base member 210. The illustrated retainer member 200 further includes a plurality of tabs 203 projecting from the walls 202 of the retainer member 200. The plurality of tabs 203 are configured to engage the plurality of openings 213 formed in the side walls 212 of the base member 210. For example, the tabs 203 are configured to interlock with the openings 213 of the base member 210 to snap the retainer member 200 in to the base member 210. Thus, the interlocking between the openings 213 and the tabs 203 ensure the navigation tool 205 is secured between the retainer member 200 and the base member 210. While the implementation illustrated in FIG. 4 shows four tabs 203 projecting from the walls 202 of the retainer member, one of ordinary skill in the art will appreciate that fewer or more tabs 203 can be implemented. In another implementation, no tabs 204 can project from the walls 202 and another fastening mechanism can be used. Additionally, one of ordinary skill in the art will appreciate the all of the walls 202 of the retainer member need not have tabs 203, and that fewer than all or none of the walls 202 can have tabs 203. For example, adhesive, bolts, or screws can be received through the openings 213 to matingly engage the retainer member 200 and the base member 210, thereby securing the navigation tool 205 therebetween.

In the illustrated implementation of FIG. 4, the tabs 203 and openings 213 are configured to snap-engage, thereby matingly engaging the retainer member 200 to the base member 210 to retain and secure the navigation tool 205 therebetween. While the illustrated implementation of FIG. 4 illustrates tabs 203, one of ordinary skill in the art will appreciate that the tabs 203 can be hooks or any other projection that can engage the openings 213 of the base member 210. Additionally, while FIG. 4 illustrates a base member 210 and retainer member 200 configures for snap engagement, one of ordinary skill in the art will appreciate that the base member 210 and retainer member 200 can be configured for any other type of mating engagement that can secure a navigation tool 205 therebetween.

Figure 5:
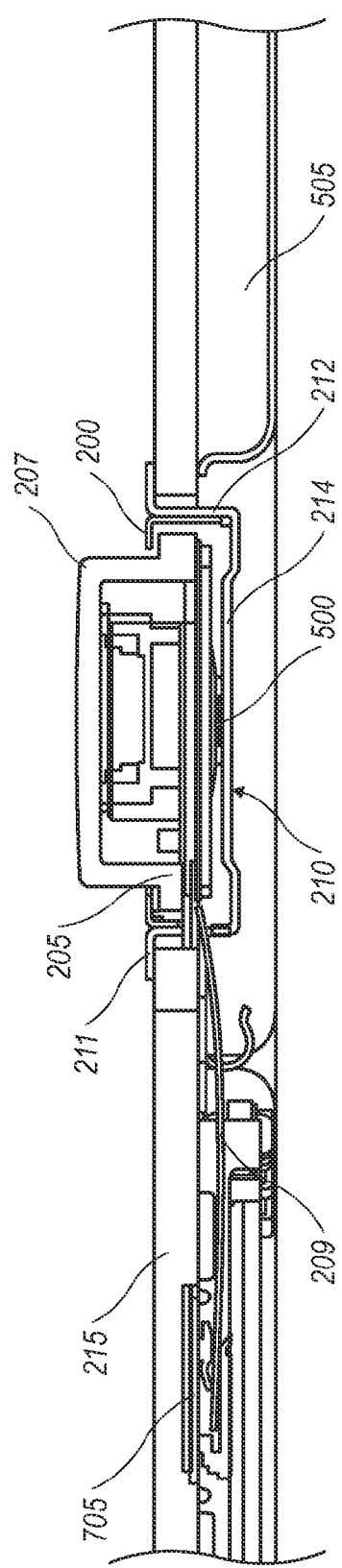
FIG. 5 is a cross sectional of the support structure assembled with a navigation tool retained in a retention mechanism illustrated in FIG. 2 taken along the A-A line.

FIG. 5 is a cross-sectional view of the navigation tool assembly assembled with a support structure of a mobile device illustrated in FIG. 2 taken along the A-A line. As illustrated in FIG. 5, the navigation tool 205 is retained between the retainer member 200 and the base member 210. The exposed portion 207 of the navigation tool 205 protrudes through the aperture 201 (shown in FIG. 4) defined by the inner edge of the retainer member 200. Also illustrated in FIG. 5, the bottom 214 of the base member 210 protrudes through the cutout 220 (shown in FIG. 3) of the support structure 215 and protrudes beyond the bottom surface of the support structure 215. As the cutout 220 of the support structure 215 provides a space for the base member 210 to receive the retention mechanism, the navigation tool 205 can be aligned with and coupled to the support structure such that the exposed portion 207 of the navigation tool has a height that is at the same dimension as the height of the keys 135 of the keyboard 130 of the mobile device. In such an implementation, since the height of the navigation tool 205 and the height of the keys 135 of the keyboard are substantially the same, the navigation tool 205 will not increase the thickness profile of the mobile device housing.

FIG. 5 also provides further detail as to the flanges 211 formed at the top edge of the side wall 212 of the base member 210. The flange 211 extends a distance away from the navigation tool 205 and abuts the top surface of the support structure 215. As illustrated in FIG. 5, the flange 211 rests on top of the support structure 215, thereby supporting the navigation tool 205 within the cutout 220 of the support structure 205. In at least one implementation, the flange 211 serves as a lip that catches the upper surface of the support structure 215 to support the base member 210, thereby allowing the navigation tool 205 to be suspended within the cutout 220 of the support structure 215. In FIG. 5, the retainer member 200 is snap engaged to the base member 210 thereby retaining the navigation tool 205 therebetween so that the navigation tool 205 does not pop out of the base member 210.

FIG. 5 further illustrates the coupling between the navigation tool 205 and the support structure 215. In FIG. 5, the connector 209 of the navigation tool 205 extends away from the center portion 207 of the navigation tool 205 through the slot 240 (shown in FIG. 2) to a connector 209 at the underside of the support structure 215. In at least one implementation the support structure 215 can be communicatively coupled to the navigation tool 205 and the display 115 of the mobile device. Thus, signals resulting from manipulations of the navigation tool 205 can be processed by a processor (not shown) of the mobile device 100 and can correspondingly perform functions on graphical items and information displayed on the display screen 115.

The navigation tool 205 illustrated in FIG. 5 is further configured for press-actuations. A switch 500 can be positioned between the navigation tool 205 and the bottom 214 of the base member 210. The switch 500 can be coupled to or affixed to the bottom 214 of the base member 210. The switch 500 can be depressed or actuated by the navigation tool 205. For example, when the navigation tool 205 is pressed, depressed, compressed, press-actuated, or otherwise actuated in a vertical direction, the bottom surface of the navigation tool 205 engages the switch 500. When the navigation tool 205 engages the switch 500, the switch 500 can be closed to enter an input to a processor (not shown) of the mobile device 100.

Figure 6:
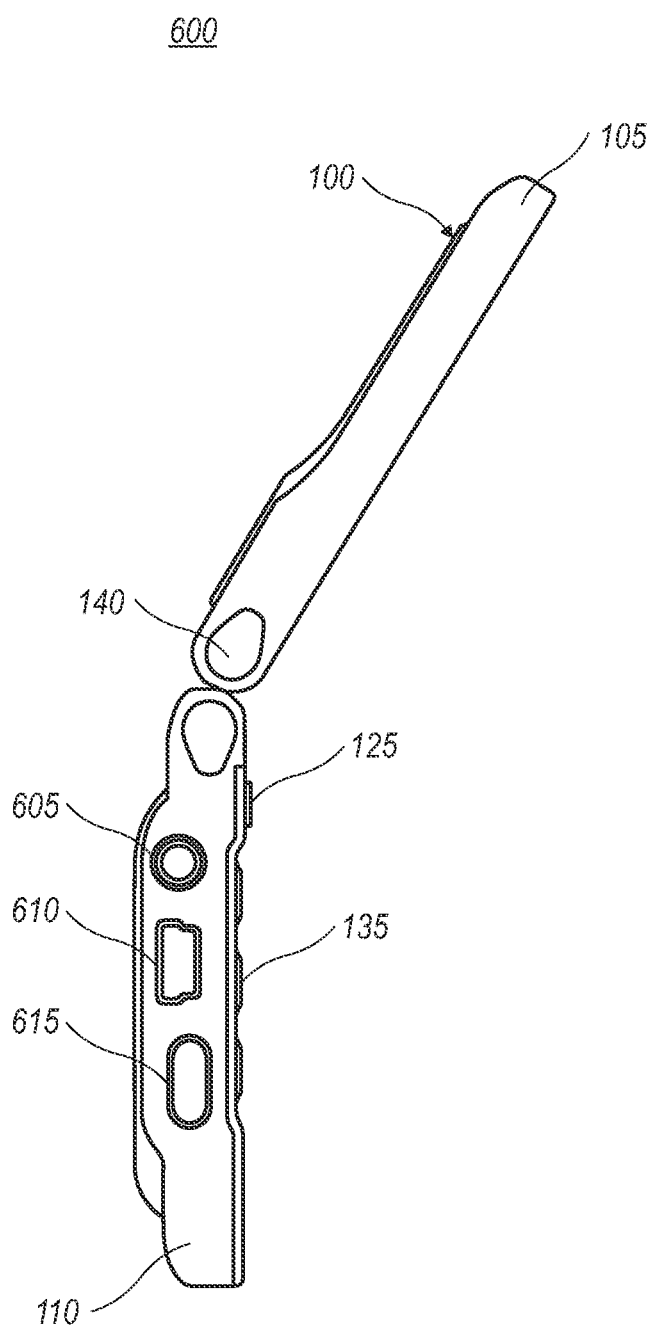
FIG. 6 is a side view of the mobile device illustrated in FIG. 1.

With the retention mechanism and the navigation tool assembly described herein, the thickness the housing of the mobile device can be minimized. Furthermore, the use of space within the housing of the mobile device can be maximized. Additionally, the retention mechanism disclosed herein allows for the implementation of navigation tools in mobile devices, slim mobile devices, flip-style mobile devices, clamshell-style mobile devices, or other mobile devices in which thin profiles are desirable. This can be accomplished without substantially increasing or adding to the overall thickness profile of the mobile device. For example, in FIG. 6, the clamshell-style mobile phone 100 is in another configuration 600 that is an open configuration. The keyboard housing 110 can include a serial port 610, an audio output port 605, and a battery connection port 615 on a first side face of the keyboard housing 110. However, one of ordinary skill in the art will appreciate that other buttons and ports can be included on the keyboard housing. The keyboard housing 110 can also include the navigation tool assembly 125 illustrated in FIG. 2 on a front face of the keyboard housing 110. More specifically, the navigation tool assembly includes the navigation tool 205 (shown in FIG. 2) retained between the base member 210 (shown in FIG. 2) and the retainer member 200 (shown in FIG. 2). As the base member 210 protrudes through the cutout 220 formed in the support structure 215, the navigation tool 205 can be sunken within the keyboard housing 110. As the cutout 220 of the support structure 215 allows the navigation tool 205 to be suspended within the cutout 220, the space within the keyboard housing 110 is maximized and efficiently utilized to accommodate the thickness profile of the navigation tool 205 without increasing the overall thickness profile of the mobile device 100. Additionally, as illustrated in FIG. 6, the exposed portion 207 of the navigation tool 205 can be aligned between the retainer member 200 and the base member 210 such that the height of the exposed portion 207 is substantially similar to the height of the keys 135 of the keyboard. In another implementation, the navigation tool assembly 125 can be placed on the keyboard housing 110 such that the height of the exposed portion 207 of the navigation tool 205 is at substantially the same as the heights of the keys 135 of the keyboard.

Figure 7:
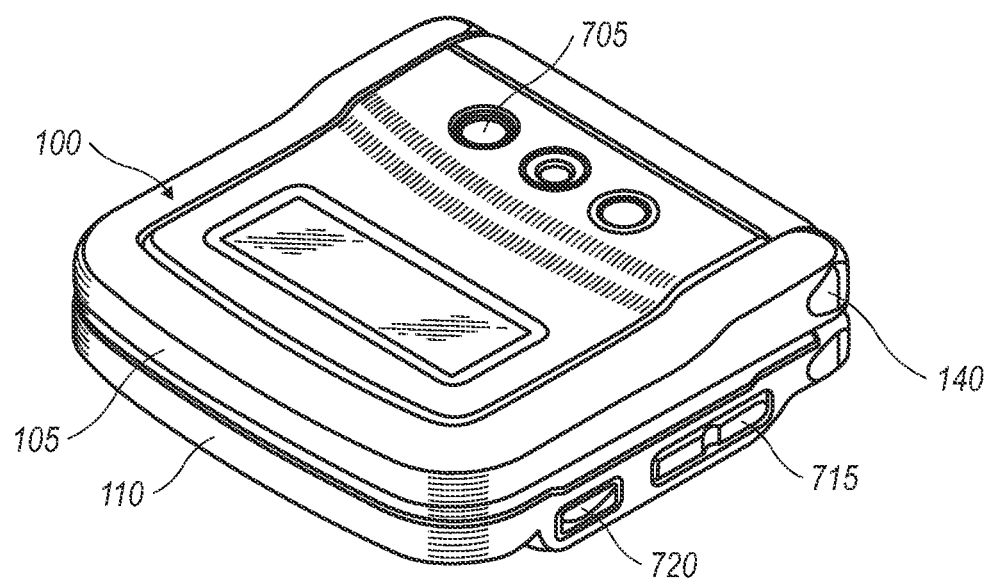
FIG. 7 is a perspective view of the mobile device illustrated in FIG. 1 in a closed configuration.
Figure 8:
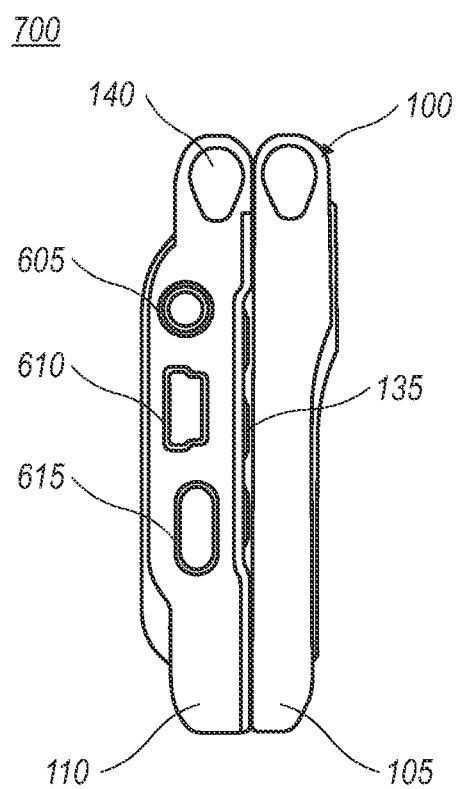
FIG. 8 is a side view of the mobile device illustrated in FIG. 7.

FIGS. 7 and 8 are illustrations of the mobile device 100 illustrated in FIG. 6 in a closed configuration 700. In the exemplary closed configuration 700, the display housing 105 and the keyboard housing 110 have been rotated about the hinge 140 such that an angle of approximately zero degrees is formed therebetween. In other words, FIG. 7 illustrates a closed configuration 700 in which the keyboard housing 110 is positioned parallel to the display housing 105 such that the keyboard housing 110 and the display housing 105 are stacked on top of each other. A camera lens 705 is provided on an outer surface of the display housing 105. FIG. 7 also illustrates additional buttons and ports on a second side face of the keyboard housing 110. In particular, FIG. 7 illustrates a volume key 715 and a media card port on a second side face opposite to the first side face illustrated in FIG. 6. One of ordinary skill will appreciate that fewer or more buttons and ports can be included than those illustrated in FIG. 7. Additionally, one of ordinary skill in the art will appreciate that other types of buttons and ports, such as a USB port, a mute key, a power button, can be included in addition to or instead of the buttons and ports illustrated in FIG. 7.

FIGS. 7 and 8 further illustrate that the navigation tool 205 and retention mechanism described herein can be implemented into a clamshell-type mobile device 100 without increasing or adding to the overall thickness of the mobile device 100. The cutout 220 of the support structure and the base member 210 of the retention mechanism described herein maximizes the interior of the keyboard housing 110. Thus, the clamshell-style mobile device 100 can include a navigation tool 205 without substantially altering the thin or slim profile of the clamshell-style mobile device 100.

Figure 9:
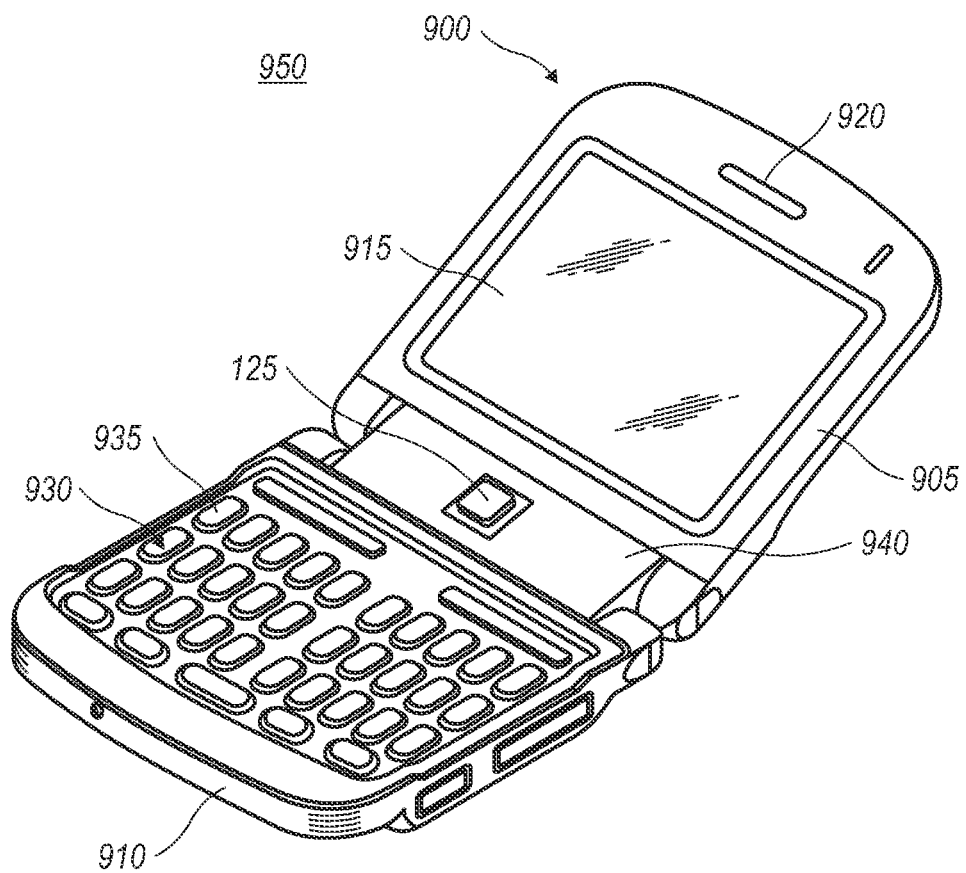
FIG. 9 is a perspective view of a mobile device having a navigation tool retained in a retention mechanism in accordance with an alternative exemplary implementation of the present disclosure where the navigation tool is positioned on a hinge of the mobile device.

FIG. 9 is an alternative implementation of the navigation tool assembly 125 having a navigation tool 205 retained between a retainer member 200 and a base member 210 assembled in a clamshell-style mobile device 900 configured in an open configuration 950. The mobile device 900 illustrated in FIG. 9 is similar to the mobile device illustrated in FIG. 1 in that the mobile device 900 connected to a keyboard housing 910 by a hinge 940. Similar to the mobile device illustrated in FIG. 1, the display housing 905 contains the display 915, and the keyboard housing 910 contains the keyboard 930 comprising a plurality of keys 935. The mobile device 900 in FIG. 9 differs from the mobile device 100 illustrated in FIG. 1 in that the navigation tool assembly 125 is contained in the hinge 940 rather than the keyboard housing 910. In another alternative implementation, the navigation tool assembly 125, and thus the navigation tool 205 and retention mechanism 200, 210, can be contained in the display housing 905.

Figure 10:
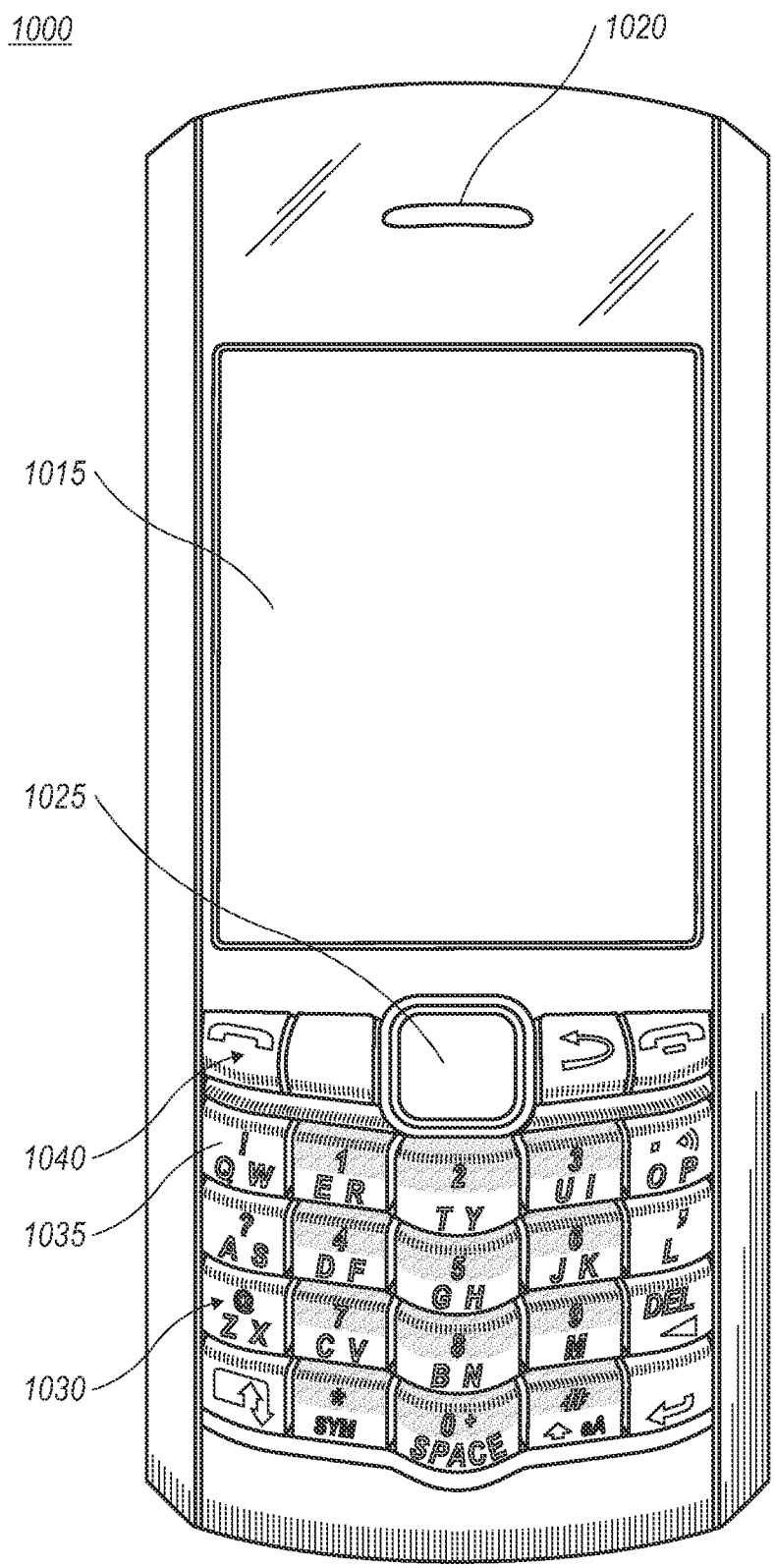
FIG. 10 is an elevational view of a candy-bar style mobile device having a navigation tool retained in a retention mechanism in accordance with an alternative exemplary implementation of the present disclosure.

FIG. 10 is yet another alternative implementation of a navigation tool assembly having a navigation tool 205 retained between a retention mechanism having a base member 210 and a retainer member 200 implemented in a mobile device 100 that is a candy-bar-style mobile device. In FIG. 10, the mobile device 1000 is a single housing which contains the speaker 1020, the display 1015, the keyboard 130 having a plurality of keys 135, and the navigation tool assembly 1025. The mobile device 1000 illustrated in FIG. 10 can also include a function key row 1040 which can include a plurality of function keys. For example, the function key row 1040 can include a call button, a return button, a menu button, an end call button, or any other button or key which can be actuated to execute a function on the mobile device 1000. In FIG. 10, the navigation tool assembly 1025 is positioned in the function key row 1040.

The navigation tool assembly 1025 illustrated in FIG. 10 is substantially similar to the navigation tool assembly 1025 illustrated in FIG. 2 in that the base member 210 (not shown) is received in a cutout 220 (not shown) of a support structure 215 (not shown) such that a bottom 214 (not shown) of the base member 210 protrudes through the support structure 215, thereby maximizing the interior space of the housing of the mobile device 1000. Similar to the clamshell-style mobile devices 100, 900 illustrated in FIGS. 1 and 6-9, the navigation tool assembly 1025 of the mobile device 1000 allows for the implementation of a navigation tool 205, which would have otherwise increased the overall thickness of the mobile device 1000, without substantially altering the thickness or profile of the mobile device 1000. The cooperation of the support structure 215 with the base member 210, retainer member 200, and navigation tool 205 can efficiently utilize the interior of the housing of the mobile device 1000 to maintain the desirable slim profile of the mobile device 1000.

While the figures described herein, illustrated a navigation tool assembly 125, 1025 incorporated on a mobile device 100, 900, 1000 having a physical keyboard 130, 930, 1030, one of ordinary skill in the art will appreciate that the navigation tool assembly 125, 1025 can be implemented on a mobile device 100, 900, 1000 simply having a touch-sensitive display with a virtual keyboard. In another embodiment, the navigation tool assembly 125, 1025 can implemented on a mobile device having a slide-out or hidden physical keyboard that is hidden by a display housing, where the navigation tool assembly 125, 1025 is placed on the display housing.

Figure 11:
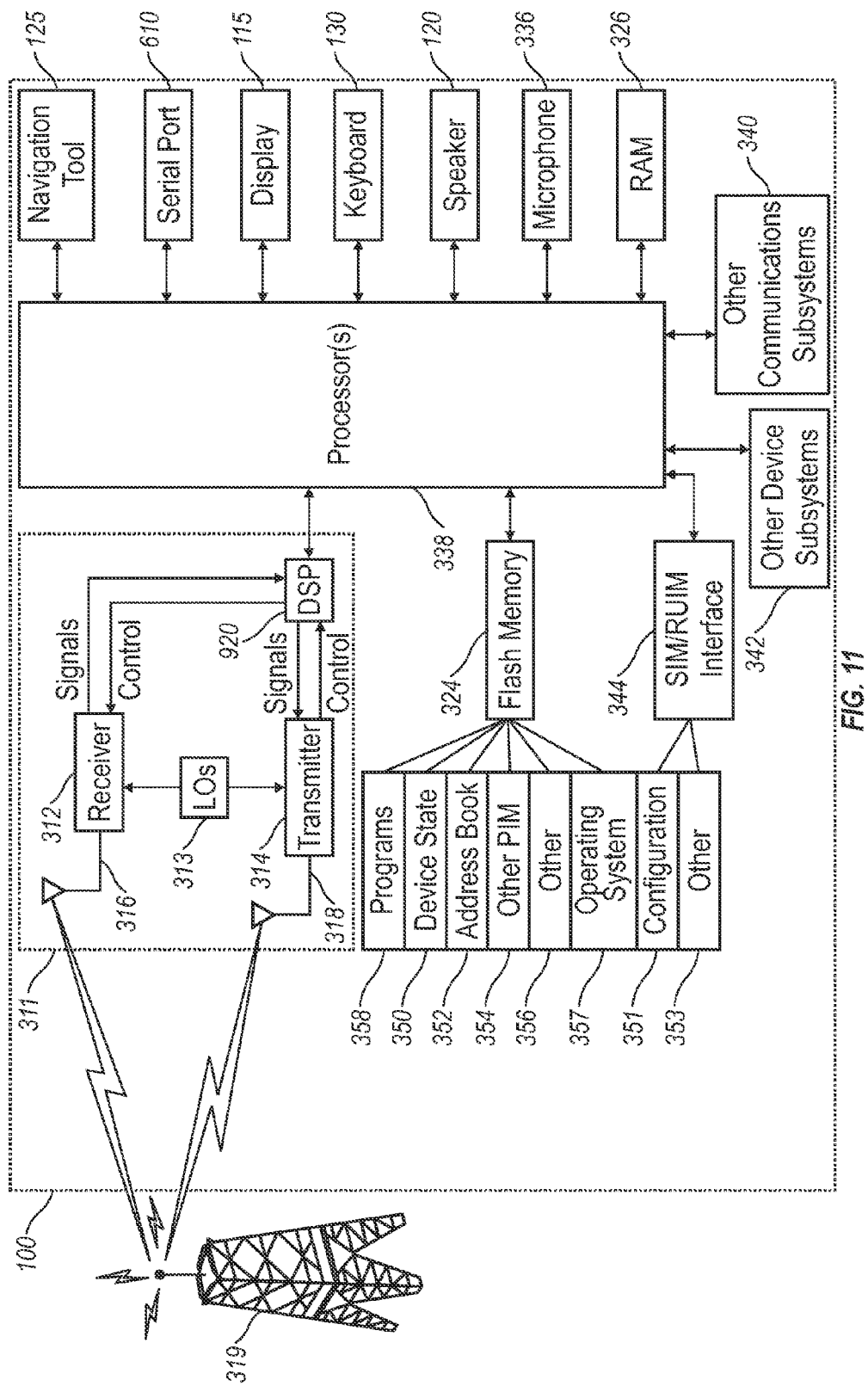
FIG. 11 is a block diagram representing a mobile device interacting in a communication network.

FIG. 11 is a block diagram of the electronic device 100 depicted FIG. 1 that includes a navigation tool housed in a navigation tool retainer member in accordance with any of the embodiments described herein. A communication subsystem 311 performs all communication transmission and reception with the wireless network 319. The processor module 338 further can be connected with an auxiliary input/output (I/O) subsystem 125 which can be connected to the communication device 100. In at least one embodiment, the processor module 338 can be connected to a serial port 610 (for example, a Universal Serial Bus port) which can allow for communication with other devices or systems. The display 115 can be connected to the processor module 338 to allow for displaying of information to an operator of the communication device 100. When the communication device 100 is equipped with a keyboard 130, the keyboard 130 can also be connected with the processor module 338. A keyboard controller (not shown) can be in communication with the processor in order to send or relay messages corresponding to key pressings of the keyboard 130 to the processor 338. Dome switches and a support structure 215 can be in communication with the keyboard controller and the processor module 338 to send and relay messages corresponding to key pressings of the keyboard 130. The communication device 100 can include the speaker 120, a microphone 336, random access memory (RAM) 326, and flash memory 324, all of which can be connected to the processor module 338. Other similar components can be provided on the device 100 as well and optionally connected to the processor module 338. Other communication subsystems 340 and other device subsystems 342 are generally indicated as being functionally connected with the processor module 338 as well. An example of a communication subsystem 340 is that of a short range communication system such as BLUETOOTH® communication module or a WI-FI® communication module (a communication module in compliance with IEEE 802.11 set of protocols) and associated circuits and components. The processor module 338 is able to perform operating system functions and enables execution of programs on the communication device 100. In some embodiments not all of the above components can be included in the communication device 100.

The auxiliary I/O subsystem can take the form of a trackpad navigation tool 125 as illustrated in the exemplary embodiment shown in FIG. 1, or an optical trackball, touch-sensitive interface, or other I/O interface. While the above examples have been provided in relation to the auxiliary I/O subsystem, other subsystems capable of providing input or receiving output from the communication device 100 are considered within the scope of this disclosure. Other keys can be placed along the side of the communication device 100 to function as escape keys, volume control keys, scrolling keys, power switches, or user programmable keys, and can likewise be programmed accordingly.

Furthermore, the communication device 100 is equipped with components to enable operation of various programs, as shown in FIG. 11. In an exemplary embodiment, the flash memory 324 is enabled to provide a storage location for the operating system 357, device programs 358, and data. The operating system 357 is generally configured to manage other programs 358 that are also stored in memory 324 and executable on the processor. The operating system 357 honors requests for services made by programs 358 through predefined program 358 interfaces. More specifically, the operating system 357 typically determines the order in which multiple programs 358 are executed on the processor and the execution time allotted for each program 358, manages the sharing of memory 324 among multiple programs 358, handles input and output to and from other device subsystems 342, and so on. In addition, operators can typically interact directly with the operating system 357 through a user interface which can include the keyboard 130, display screen 115 and other I/O devices, including the navigation tool 125. While in an exemplary embodiment the operating system 357 is stored in flash memory 324, the operating system 357 in other embodiments is stored in read-only memory (ROM) or similar storage element (not shown). As those skilled in the art will appreciate, the operating system 357, device program 358 or parts thereof can be loaded in RAM 326 or other memory.

In one exemplary embodiment, the flash memory 324 contains programs 358 for execution on the communication device 100 including an address book 352, a personal information manager (PIM) 354, and the device state 350. Furthermore, programs 358 and other information 356 including data can be segregated upon storage in the flash memory 324 of the communication device 100.

When the communication device 100 is enabled for two-way communication within the wireless communication network 319, it can send and receive messages from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 100 can require a unique identifier to enable the communication device 100 to transmit and receive messages from the communication network 319. Other systems may not require such identifying information. GPRS, UMTS, and EDGE use a Subscriber Identity Module (SIM) in order to allow communication with the communication network 319. Likewise, most CDMA systems use a Removable User Identity Module (RUIM) in order to communicate with the CDMA network. The RUIM and SIM card can be used in multiple different communication devices 100. The communication device 100 can be able to operate some features without a SIM/RUIM card, but it will not be able to communicate with the network 319. A SIM/RUIM interface 344 located within the communication device 100 allows for removal or insertion of a SIM/RUIM card (not shown). The SIM/RUIM card features memory and holds key configurations 351, and other information 353 such as identification and subscriber related information. With a properly enabled communication device 100, two-way communication between the communication device 100 and communication network 319 is possible.

If the communication device 100 is enabled as described above or if the communication network 319 does not require such enablement, the two-way communication enabled communication device 100 is able to both transmit and receive information from the communication network 319. The transfer of communication can be from the communication device 100 or to the communication device 100. In order to communicate with the communication network 319, the communication device 100 in the presently described exemplary embodiment is equipped with an integral or internal antenna 318 for transmitting messages to the communication network 319. Likewise the communication device 100 in the presently described exemplary embodiment is equipped with another antenna 316 for receiving communication from the communication network 319. These antennae (316, 318) in another exemplary embodiment are combined into a single antenna (not shown). As one skilled in the art would appreciate, the antenna or antennae (316, 318) in another embodiment are externally mounted on the communication device 100.

When equipped for two-way communication, the communication device 100 features a communication subsystem 311. As is understood in the art, this communication subsystem 311 is modified so that it can support the operational needs of the communication device 100. The subsystem 311 includes a transmitter 314 and receiver 312 including the associated antenna or antennae (316, 318) as described above, local oscillators (LOs) 313, and a processing module 320 which in the presently described exemplary embodiment is a digital signal processor (DSP) 320.

It is contemplated that communication by the communication device 100 with the wireless network 319 can be any type of communication that both the wireless network 319 and communication device 100 are enabled to transmit, receive and process. In general, these can be classified as voice and data. Voice communication generally refers to communication in which messages for audible sounds are transmitted by the communication device 100 through the communication network 319. Data generally refers to all other types of communication that the communication device 100 is capable of performing within the constraints of the wireless network 319.

Example device programs that can depend on such data include email, contacts and calendars. For each such program, synchronization with home-base membered versions of the programs can be desirable for either or both of their long term and short term utility. As an example, emails are often time sensitive, so substantially real time synchronization can be desired. Contacts, on the other hand, can be usually updated less frequently without inconvenience. Therefore, the utility of the communication device 100 is enhanced when connectable within a communication system, and when connectable on a wireless basis in the network 319 in which voice, text messaging, and other data transfer are accommodated.

Exemplary implementations have been described hereinabove regarding a retention mechanism for a navigation tool of a mobile device. One of ordinary skill in the art will appreciate that the features in each of the figures described herein can be combined with one another and arranged to achieve the described benefits of the presently disclosed retention mechanism for a navigation tool of a mobile device 100. Additionally, one of ordinary skill will appreciate that the elements and features from the illustrated implementations herein can be optionally included to achieve the described benefits of the presently disclosed retention mechanism for a navigation tool of a mobile device. Various modifications to and departures from the disclosed implementations will occur to those having skill in the art. The subject matter that is intended to be within the spirit of this disclosure is set forth in the following claims.

What is claimed is:

1. A device comprising:
    a printed circuit board provided within an interior of the device, the printed circuit board having an upper surface, a bottom surface, and defining a cutout; and
    a navigation tool assembly positioned in the cutout, the navigation tool assembly comprising:
        a base member inserted into the cutout;
        a retainer member configured for mating engagement with the base member, the retainer member defining an aperture; and
        a navigation tool retained by the retainer member and between the base member and the retainer member, at least a portion of the navigation tool extending through the aperture, the navigation tool being communicatively coupled to the printed circuit board.

2. The device of claim 1, wherein the navigation tool is one of a jogball, an optical trackball, and an optical jogball.

3. The device of claim 1, wherein the base member and the retainer member are configured for snap-in engagement.

4. The device of claim 1, wherein the retainer member comprises a tab and the base member defines an opening corresponding to the tab, the tab and the opening being configured to interlock to matingly engage the retainer member to the base member.

5. The device of claim 1, wherein the base member comprises a flange supported on the upper surface of the printed circuit board, the flange being configured to secure the navigation tool assembly to the printed circuit board.

6. The device of claim 1, wherein the base member comprises a bottom, the bottom being configured to protrude beyond the bottom surface of the printed circuit board.

7. The device of claim 1, wherein the base member comprises a material that provides at least one of RF shielding and EMI shielding.

8. The device of claim 1, wherein the navigation tool comprises a center portion and a connector extending from the center portion and extending outward from the base member, the connector communicatively coupling the navigation tool to the printed circuit board.

9. The device of claim 8, wherein the connector is communicatively coupled to the printed circuit board at the bottom surface of the printed circuit board.

10. The device of claim 1, further comprising:
    a keyboard portion that houses the navigation tool assembly; and
    a display portion coupled to the keyboard portion, the display portion housing a display that is electronically coupled to the navigation tool assembly, the display and the navigation tool assembly being concealed when the device is positioned in a first configuration.

11. The device of claim 1, wherein the navigation tool is an optical trackpad.

12. A retention mechanism for coupling a navigation tool to a printed circuit board of an electronic device, the printed circuit board being provided within an interior of the electronic device and defining a cutout, the retention mechanism comprising:

a base member having a bottom and a plurality of walls, the bottom and the plurality of walls defining a cavity for receiving the navigation tool; and a retainer member defining an opening for the navigation tool, the retainer member configured for mating engagement with the base member, the base member being configured for insertion through the cutout, such that the bottom protrudes from the cutout within the interior of the electronic device, wherein the navigation tool is retained by the retainer member and between the base member and the retainer member.

13. The retention mechanism of claim 12, wherein the navigation tool is one of a jogball, an optical trackball, an optical navigation tool, and an optical jogball.

14. The retention mechanism of claim 12, wherein the retainer member comprises a tab and the base member defines an opening corresponding to the tab, the tab and the opening being configured to interlock when the retainer member and the base member are matingly engaged.

15. The retention mechanism of claim 12, wherein the navigation tool further comprises a connector, the base member and the retainer member forming a slot that receives the connector when matingly engaged.

16. The retention mechanism of claim 12, wherein the navigation tool is an optical trackpad.

17. A navigation tool assembly that is affixed to a printed circuit board provided within an interior of an electronic device and having a cutout, the navigation tool assembly comprising:

a base member having a shape corresponding to the cutout of the printed circuit board, the base member configured for insertion in the cutout within the interior of the electronic device;

a retainer member configured for mating engagement with the base member, the retainer member defining an aperture; and a navigation tool retained by the retainer member and between the base member and the retainer member, at least a portion of the navigation tool extending through the aperture.

18. The navigation tool assembly of claim 17, wherein the navigation tool is one of a jogball, an optical trackball, and an optical jogball.

19. The navigation tool assembly of claim 17, wherein the retainer member comprises a tab and the base member defines an opening corresponding to the tab, the tab and the opening being configured to interlock to matingly engage the retainer member to the base member.

20. The navigation tool assembly of claim 17, wherein the base member comprises:

a floor;

a plurality of side walls, each side wall having a top and a bottom, the bottom of each side wall being connected to the floor; and a lip formed at the top of at least one of the plurality of side walls, the lip being configured to support the navigation tool on the printed circuit board, the plurality of side walls and the floor define a cavity for receiving the navigation tool.

21. The navigation tool assembly of claim 20, wherein the navigation tool comprises a center portion and a connector extending from the center portion; and wherein at least one of the plurality of side walls comprises an opening, the opening forming a slot when the retainer member matingly engages the base member, and the connector being received by and extending through the slot.

22. The navigation tool assembly of claim 17, wherein the navigation tool comprises a center portion and a connector extending from the center portion; and wherein a slot is formed between the base member and the retainer member, such that the connector extends through the slot.

23. The navigation tool assembly of claim 17, wherein the navigation tool is an optical trackpad.

* * * * *